United States Patent
Lee et al.

(10) Patent No.: US 8,155,229 B2
(45) Date of Patent: Apr. 10, 2012

(54) APPARATUS AND METHOD FOR TRANSMITTING/RECEIVING A SIGNAL IN A COMMUNICATION SYSTEM

(75) Inventors: Ye-Hoon Lee, Suwon-si (KR); Dong-Ho Kim, Seoul (KR); Yeheskel Bar-Ness, Newark, NJ (US); Jordi Diaz, Cambridge, MA (US)

(73) Assignees: Samsung Electronics Co., Ltd. (KR); New Jersey Institute of Technology, Newark, NJ (US)

( * ) Notice: Subject to any disclaimer, the term of this patent is extended or adjusted under 35 U.S.C. 154(b) by 1328 days.

(21) Appl. No.: 11/603,859

(22) Filed: Nov. 22, 2006

(65) Prior Publication Data

US 2007/0127593 A1   Jun. 7, 2007

Related U.S. Application Data

(60) Provisional application No. 60/739,080, filed on Nov. 22, 2005.

(51) Int. Cl.
*H04B 7/02* (2006.01)
(52) U.S. Cl. ........ 375/267; 375/260; 375/295; 375/299; 370/203; 370/208; 370/210
(58) Field of Classification Search ........ 375/260, 375/267, 299; 455/69; 370/334
See application file for complete search history.

(56) References Cited

U.S. PATENT DOCUMENTS

| | | | |
|---|---|---|---|
| 2003/0007476 A1* | 1/2003 | Kim et al. | 370/342 |
| 2005/0220199 A1* | 10/2005 | Sadowsky et al. | 375/260 |
| 2006/0067277 A1* | 3/2006 | Thomas et al. | 370/334 |
| 2006/0093065 A1* | 5/2006 | Thomas et al. | 375/299 |
| 2006/0187815 A1* | 8/2006 | Wallace et al. | 370/203 |
| 2006/0239366 A1* | 10/2006 | Kim et al. | 375/260 |
| 2007/0054633 A1* | 3/2007 | Piirainen | 455/115.3 |

FOREIGN PATENT DOCUMENTS

| | | |
|---|---|---|
| KR | 102005002718 | 3/2005 |
| WO | WO 01/71928 | 9/2001 |

\* cited by examiner

*Primary Examiner* — Khanh C Tran
*Assistant Examiner* — Eboni Hughes
(74) *Attorney, Agent, or Firm* — The Farell Law Firm, P.C.

(57) ABSTRACT

An apparatus is provided for transmitting a signal in a communication system. Upon receipt of an information vector, the apparatus includes converting the information vector into a plurality of sub-information vectors; performing coding and modulation on each of the sub-information vectors according to a corresponding mode thereby generating a modulation symbol; interleaving the modulation symbol generated for each of the sub-information vectors; allocating power to the interleaved modulation symbol for each individual mode; and beamforming the modulation symbols power-allocated for each individual mode, and transmitting the beamforming symbols.

10 Claims, 5 Drawing Sheets

| Mode | 1 | 2 | 3 | 4 | 5 | 6 | 7 | 8 |
|---|---|---|---|---|---|---|---|---|
| SNR | -6 | -1.6 | 0.8 | 2.8 | 4.4 | 6 | 8.5 | 10.7 |

APPARATUS AND METHOD FOR TRANSMITTING/RECEIVING A SIGNAL IN A COMMUNICATION SYSTEM

This application claims priority under 35 U.S.C. §119 to an application entitled "Channel-sorting, AMC and WF/CI Power Allocation" filed in the U.S. Patent and Trademark Office on Nov. 22, 2005 and assigned Ser. No. 60/739,080, the contents of which are incorporated herein by reference.

BACKGROUND OF THE INVENTION

1. Field of the Invention

The present invention relates generally to a communication system, and in particular, to an apparatus and method for transmitting/receiving a signal in a communication system.

2. Description of the Related Art

Communication systems are evolving to provide terminals with services capable of enabling high-speed, high-capacity signal transmission/reception. To meet the demand for the high-speed, high-capacity signal transmission/reception, the communication systems consider using a Multiple Input Multiple Output (MIMO)-Orthogonal Frequency Division Multiplexing (OFDM) scheme that can acquire space diversity and frequency diversity and can also enable high-speed, high-capacity signal transmission/reception. Herein, the term "MIMO-OFDM scheme" refers to a combined scheme of MIMO and OFDM.

Meanwhile, an Adaptive Modulation and Coding (AMC) scheme is well known as a scheme that increases the total efficiency of a communication system using a modulation scheme and a coding scheme depending on a channel status between a signal transmission apparatus and a signal reception apparatus. Therefore, the communication system considers using the MIMO-OFDM scheme and the AMC scheme in combination in order to improve its total efficiency while enabling the high-speed, high-capacity signal transmission/reception. However, up to the present, there has been no detailed scheme that uses the MIMO-OFDM scheme, the AMC scheme, a power allocation scheme, and a beamforming scheme in combination. Accordingly, there is a need for a detailed scheme that uses the MIMO-OFDM scheme, the AMC scheme, the power allocation scheme, and the beamforming scheme in combination.

SUMMARY OF THE INVENTION

It is, therefore, an object of the present invention to provide an apparatus and method for transmitting/receiving a signal in a communication system.

It is another object of the present invention to provide an apparatus and method for transmitting/receiving a signal using a MIMO-OFDM scheme, an AMC scheme, a power allocation scheme, and a beamforming scheme in a communication system.

According to one aspect of the present invention, there is provided an apparatus for transmitting a signal in a communication system. The apparatus comprises a serial-to-parallel converter for, upon receipt of an information vector, converting the information vector into a plurality of sub-information vectors; a plurality of encoders for coding each of the sub-information vectors according to a corresponding mode; a plurality of modulators for modulating signals output from the encoders thereby generating modulation symbols; an interleaver/per-mode power allocator for interleaving the modulation symbols output from the modulators, and allocating power for the interleaved modulation symbols for each individual mode; a plurality of beamformers for beamforming the interleaved modulation symbols output from the interleaver/per-mode power allocator; and a transmitter for transmitting the beamformed signal.

According to one aspect of the present invention, there is provided a method for transmitting a signal in a signal transmission apparatus of a communication system. The method includes the steps of: upon receipt of an information vector, converting the information vector into a plurality of sub-information vectors; performing coding and modulation on each of the sub-information vectors according to a corresponding mode thereby generating a modulation symbol; interleaving the modulation symbol generated for each of the sub-information vectors; allocating power to the interleaved modulation symbol for each individual mode; and beamforming the modulation symbols power-allocated for each individual mode, and transmitting the beamformed symbols.

DETAILED DESCRIPTION OF THE PREFERRED EMBODIMENTS

Figure 1:
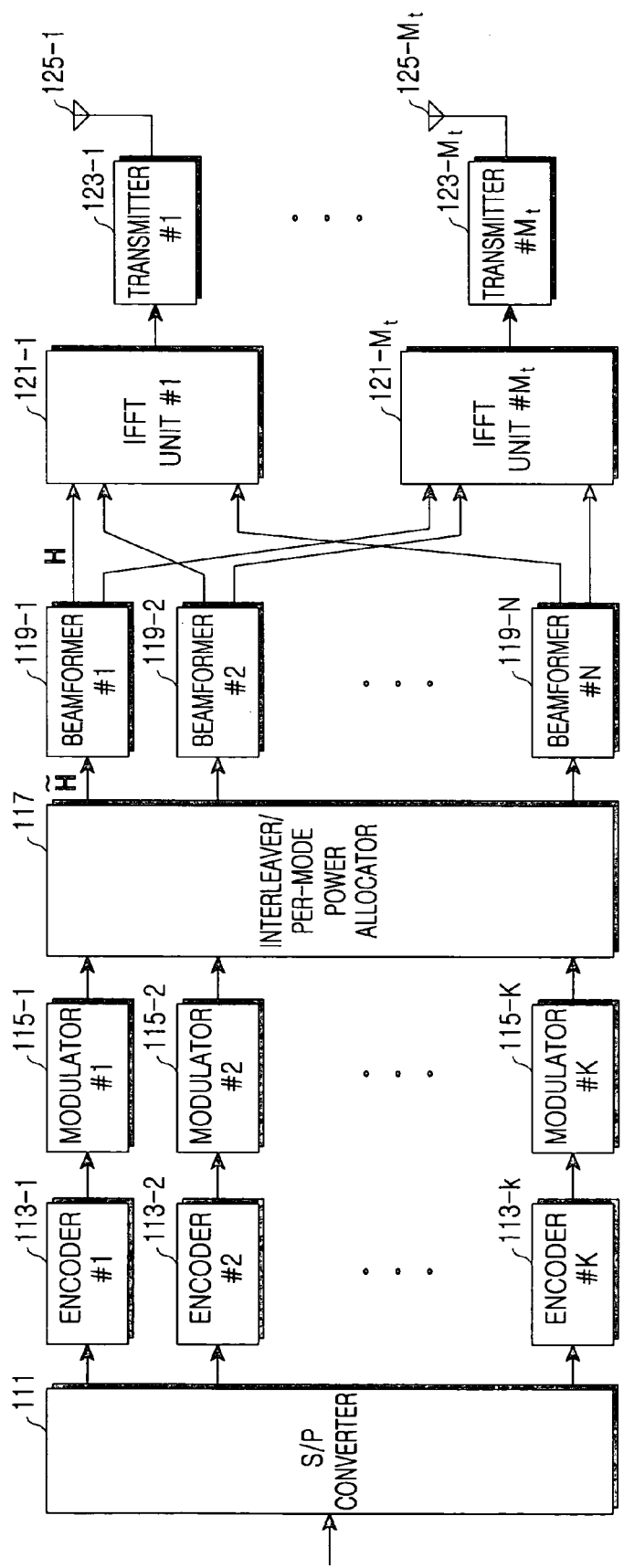
FIG. 1 is a diagram illustrating a structure of a signal transmission apparatus in a MIMO-OFDM communication system according to an embodiment of the present invention.

Exemplary embodiments of the present invention will now be described in detail with reference to the annexed drawings. In the following description, a detailed description of known functions and configurations incorporated herein has been omitted for clarity and conciseness.

The present invention proposes an apparatus and method for transmitting/receiving a signal in a communication system. In particular, the present invention proposes an apparatus and method for transmitting/receiving a signal using an Adaptive Modulation and Coding (AMC) scheme, a per-mode power allocation scheme, and a beamforming scheme in a communication system using a Multiple Input Multiple Output (MIMO)-Orthogonal Frequency Division Multiplexing (OFDM) scheme (hereinafter referred to as a "MIMO-OFDM communication system"). Herein, the term "MIMO-OFDM scheme" refers to a combined scheme of MIMO and OFDM.

A description will now be made of a system model for the MIMO-OFDM communication system proposed in the present invention.

The MIMO-OFDM communication system includes a signal transmission apparatus and a signal reception apparatus, and it will be assumed that the signal transmission apparatus includes $M_t$ transmission antennas and the signal reception apparatus includes $M_r$ reception antennas. In addition, it will be assumed that the signal transmission apparatus and the signal reception apparatus use N sub-carriers and also use average power P. Herein, it will be assumed that signal transmission/reception in the MIMO-OFDM communication system is achieved through a constant frequency-selective fading channel for one-OFDM symbol interval. In this case, an input-output relationship given by an $f^{th}$ sub-carrier in an $n^{th}$ OFDM symbol can be expressed as Equation (1).

$$y[n,f]=H[n,f]x[n,f]+w[n,f] \qquad (1)$$

In Equation (1), y ($y \in C^{M_r \times 1}$) denotes a received signal vector, x ($x \in C^{M_t \times 1}$) denotes a transmission signal vector, w ($w \in C^{M_r \times 1}$) denotes a white noise vector for circular symmetric complex Gaussian, and H($H \in C^{M_r \times M_t}$) denotes a channel matrix. Herein, $y \in C^{M_r \times 1}$ indicates that y belongs to a set of $m_r \times 1$ row vectors where each component of a row vector is a complex number, and $x \in C^{M_t \times 1}$ indicates that x belongs to a set of $M_t \times 1$ row vectors where each component of a row vector is a complex number, and $w \in C^{M_r \times 1}$ indicates that w belongs to a set of $m_r \times 1$ row vectors where each component of a row vector is a complex number. For example, for $M_r=2$, $y=[1+j, 1-j]T$. In Equation (1), the channel matrix H can be expressed as Equation (2).

$$H[n,f]=\begin{bmatrix} h_{1,1[n,f]} & \cdots & h_{1,M[n,f]} \\ \cdots & \cdots & \cdots \\ h_{M,1[n,f]} & \cdots & h_{M,M[n,f]} \end{bmatrix} \qquad (2)$$

In Equation (2), $h_{ij}$ denotes a channel gain from a $j^{th}$ transmission antenna to an $i^{th}$ reception antenna.

In addition, it will be assumed that the signal transmission apparatus knows the channel matrix H. Singular value decomposition of the channel matrix H can be expressed as Equation (3).

$$H=U\Lambda V^* \qquad (3)$$

In Equation (3), U ($U \in C^{M_r \times M_r}$) and V ($V \in C^{M_t \times M_t}$) each denote a unitary matrix, and $\Lambda$($\Lambda \in R^{M_r \times M_t}$) denotes a rectangular matrix where diagonal elements are $\tilde{h}[s]=(s=1,\ldots,$ main$\{M_t,M_r\})$ and non-diagonal elements are zero. Herein, the diagonal elements $\tilde{h}[s]=(s=1,\ldots,$ main$\{M_t,M_r\})$ represent non-negative real numbers. Generally, the beamforming scheme uses the unitary matrixes U and V in order to convert a self-interfered MIMO channel into parallel channels. That is, in the beamforming scheme, the signal transmission apparatus performs linear conversion ($\tilde{x}=V^*x$) on a transmission signal vector x and transmits the result to the signal reception apparatus, and the signal reception apparatus performs linear conversion ($\tilde{y}=U^*y$) on a received signal vector.

When the signal transmission apparatus uses the beamforming scheme, the vector $\tilde{y}$ can be expressed as Equation (4).

$$\tilde{y}=U^*y=U^*(Hx+w)=U^*HV\tilde{x}+U^*w=U^*U\Lambda V^*V\tilde{x}+U^*w \qquad (4)$$

However, because $U^*U$ and $V^*V$ each are a unitary matrix, a relationship of Equation (5) can be obtained by recovering time and frequency indexes [n,f] in Equation (4).

$$\tilde{y}[n,f]=\Lambda[n,f]\tilde{x}[n,f]+\tilde{w}[n,f] \qquad (5)$$

In Equation (5), $\tilde{w}=U^*w$ has the same variance value as the white noise vector w. From a comparison between Equation (1) and Equation (5), it can be noted that a rectangular matrix $\Lambda$ is a diagonal matrix. Therefore, in Equation (5), a relationship between the vectors $\tilde{y}$ and $\tilde{x}$ is equivalent between constituent components as shown in Equation (6).

$$\tilde{y}[s,n,f]=\tilde{h}[s,n,f]\tilde{x}[s,n,f]+\tilde{w}[s,n,f] \qquad (6)$$

In addition, when 3-dimensional matrix expression is used, a relationship of Equation (7) is given.

$$\tilde{Y}=\tilde{H}\cdot\tilde{X}+\tilde{W} \qquad (7)$$

In Equation (7), $\tilde{Y}(\tilde{Y} \in C^{M \times L \times N})$ and $\tilde{H}(\in \tilde{H}C^{M \times L \times N})$ each denote a 3-dimensional matrix of an antenna, and time and frequency domains, and components of each 3-dimensional matrix represent $\tilde{y}[s, n, f]$ and $\tilde{h}[s, n, f]$. Further, in Equation (7), · denotes an operator for performing a multiplication operation between components, + denotes an operator for performing an addition operation between components, and M denotes a minimum value out of $M_t$ and $M_r$ (M=main$\{M_t, M_r\}$).

If L is assumed to be a modulation symbol length in the time domain, Equation (6) and Equation (7) are construed as communication through LAM parallel channels from the vector $\tilde{X}$ to the vector $\tilde{V}$. Herein, L denotes the number of OFDM symbols necessary for transmitting the entire information frame. That is, the vector $\tilde{X}$ transmitted by the signal transmission apparatus is received at the signal reception apparatus over the LNM parallel channels, and the signal received at the signal reception apparatus is the vector $\tilde{V}$.

Next, a description will be made of a scheme for transmitting/receiving a signal using an AMC scheme in the MIMO-OFDM communication system having the system model described above.

First, it will be assumed that $\tilde{X}$ is a vector expressed as a 3-dimensional matrix of space domain, time domain, and frequency domain, having an LNM symbol size. Herein, the size LNM indicates a size of LM OFDM symbols. With reference to FIG. 1, a description will now be made of a structure of a signal transmission apparatus in a MIMO-OFDM communication system according to an embodiment of the present invention.

FIG. 1 is a diagram illustrating a structure of a signal transmission apparatus in a MIMO-OFDM communication system according to an embodiment of the present invention.

Referring to FIG. 1, the signal transmission apparatus includes a serial-to-parallel converter 111, a plurality of, for example, K encoders 113-1~113-K, K modulators 115-1~115-K, an interleaver/per-mode power allocator 117, a plurality of, for example, N beamformers 119-1~119-N, a plurality of, for example, $M_t$ Inverse Fast Fourier Transform (IFFT) units 121-1~121-$M_t$, a plurality of, for example, $M_t$ transmitters 123-1~123-$M_t$, and a plurality of, for example, $M_t$ transmission antennas 125-1~125-$M_t$. Herein, the encoders 113-1~113-K can be implemented with turbo encoders by way of example, and coding rates of the encoders 113-1~113-K are assumed to be $r_1$ to $r_k$, respectively. In addition, constellation sizes of the K modulators 115-1~115-K are assumed to be $A_1$ to $A_k$, respectively, and powers of the K modulators 115-1~115-K are assumed to be $P_1$ to $P_k$, respectively. Herein, the coding rates $r_1$ to $r_k$ can be equal to or different from each other, the constellation sizes $A_1$ to $A_k$ can also be equal to or different from each other, and the powers $P_1$ to $P_k$ can also be equal to or different from each other.

If an information vector including B information data bits is generated, the information vector is delivered to the serial-to-parallel converter 111. The serial-to-parallel converter 111 generates K independent sub-information vectors using the input information vector, and outputs the K sub-information vectors to their corresponding encoders. For example, if the K sub-information vectors are assumed to be a sub-information vector #1 to a sub-information vector #K, the sub-information vector #1 is output to the encoder #1 113-1 and the sub-information vector #K is output to the encoder #k 113-K. Herein, the numbers of the information data bits included in the K sub-information vectors are assumed to be $B_1$ to $B_k$, respectively. Of course, $B_1$ to $B_k$ can be equal to or different from each other.

Because the encoders 113-1~113-K and the modulators 115-1~115-K are almost equal to each other in terms of operation except for the coding rate, constellation size and power, operations of the encoders 113-1~113-K and the modulators 115-1~115-K will be described with reference to the encoder #K 113-K and the modulator #K 1150K by way of example. The encoder #K 113-K encodes the sub-information vector #K output from the serial-to-parallel converter 111 according to a coding rate $r_k$, and outputs the result to the modulator #K 115-K. The modulator #K 115-K modulates the signal output from the encoder #K 113-K according to a constellation size $A_k$ and power $P_k$, and outputs the result to the interleaver/per-mode power allocator 117.

Figure 2:
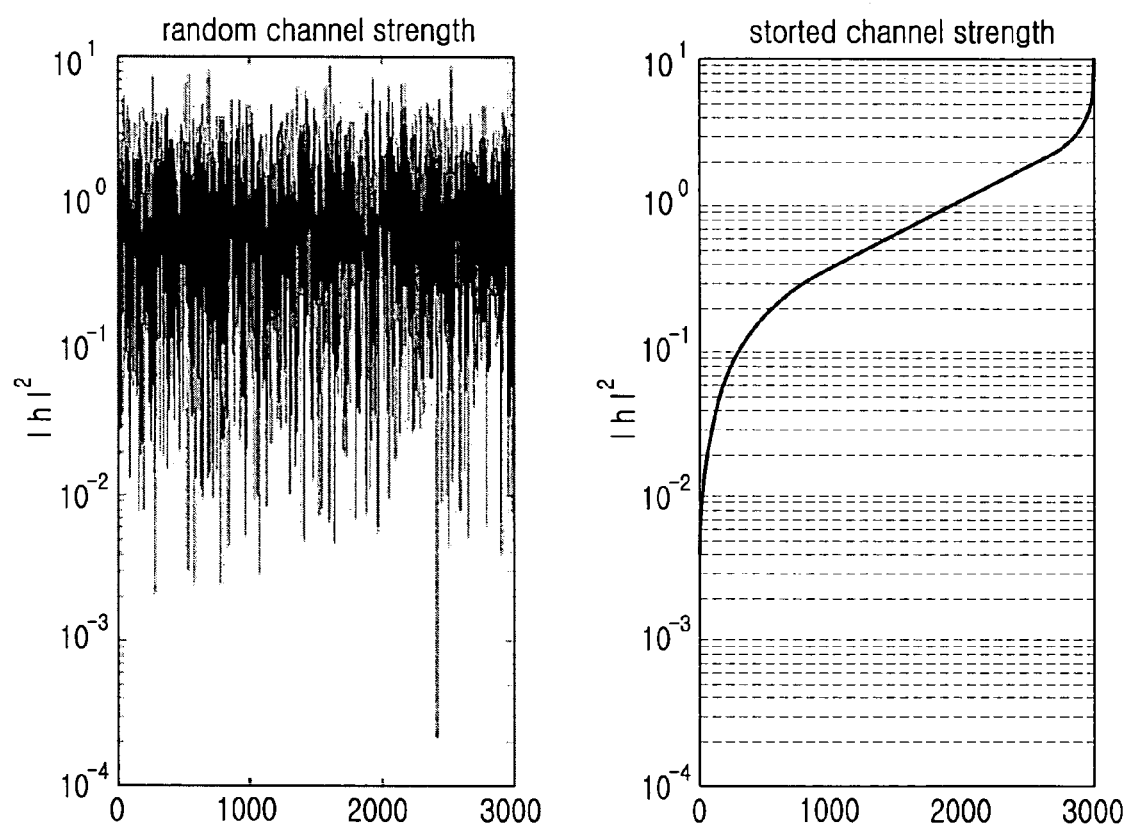
FIG. 2 is a graph illustrating a size of a channel before and after interleaving performed according to an embodiment of the present invention.

A description will now be made of modes used in the AMC scheme. The modes are defined depending on the coding rate, the constellation size corresponding to a modulation scheme, and the power, and can be expressed as $[r_k, A_k, P_k]$. In an embodiment of the present invention, the number of modes supportable in the AMC scheme will be assumed to be K. Meanwhile, a frequency selective channel represents a channel whose size variation is considerable in the frequency domain as shown in FIG. 2. That is, because the frequency selective channel differs in channel size according to frequency domain, it is easy for the interleaver/per-mode power allocator 117 to classify the frequency selective channels into modes according to their size. A full bit rate $R_k$ in a mode k can be expressed as Equation (8).

$$R_k = r_k \log_2(A_k) \tag{8}$$

In Equation (8), $[r_k, A_k]$ should be selected such that it satisfies the condition of Equation (9).

$$R_k < \log_2\left(1 + \frac{P_k |h_k|^2}{N_0}\right) \tag{9}$$

Figure 3:
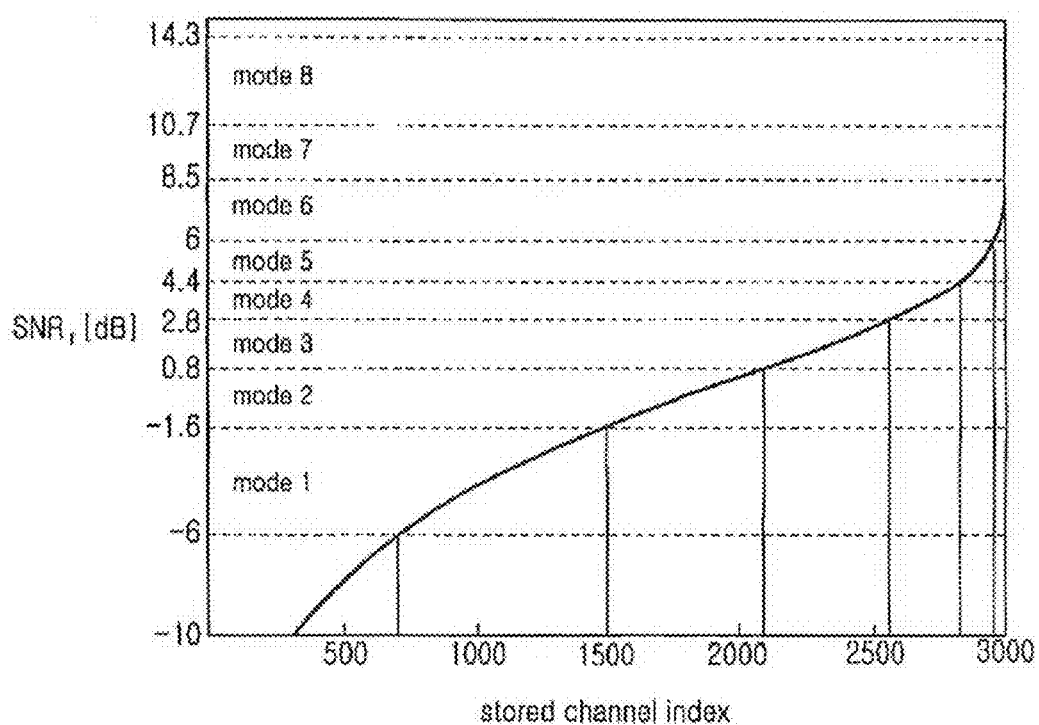
FIG. 3 is a graph illustrating a result obtained by division into mode group depending on a size after performing an interleaving process according to an embodiment of the present invention.

A relationship between the full bit rates of individual modes is $R_1 < R_2 < \ldots < R_K$, and as shown in FIG. 3, the modes are classified in order of a low bit rate $R_1$ to a high bit rate $R_K$. In addition, the number of information data symbols in a modulation symbol generated in the mode k is $D_k = B_k/R_k$, and the total number of data symbols should satisfy the condition of Equation (10). That is, one modulation symbol includes $D_k$ information data symbols.

$$D = \sum_{k=1}^{K} D_k = LMN \tag{10}$$

All modulation symbols input to the interleaver/per-mode power allocator 117 should have a mode index indicating the mode k applied thereto, and should also have a position i (i=1, ..., $D_k$) in the mode. The interleaver/per-mode power allocator 117 interleaves each modulation symbol x'[k,i] such that it moves to a corresponding position of the vector $\tilde{X}$, and then allocates power thereto for each individual mode. In conclusion, the vector $\tilde{X}$ represents the signal output from the interleaver/per-mode power allocator 117 before each beamformer performs beamforming. Here, because the signal transmission apparatus uses N sub-carriers, the interleaver/per-mode power allocator 117 should interleave all input modulation symbols and generate a total of N interleaved modulation symbols. A structure of the interleaver/per-mode power allocator 117 affects the adaptive characteristic of the MIMO-OFDM communication system, and a detailed description thereof will be made hereinbelow.

The total of the N interleaved modulation symbols output from the interleaver/per-mode power allocator 117 are input to the beamformer #1 119-1 to the beamformer #N 119-N independently. The beamformer #1 119-1 to the beamformer #N 119-N each perform beamforming on the modulation symbols received from the interleaver/per-mode power allocator 117, generate $M_t$ beamformed symbols, and output the $M_t$ beamformed symbols to the IFFT unit #1 121-1 to the IFFT unit #$M_t$ 121-$M_t$ independently. The IFFT unit #1 121-1 to the IFFT unit #$M_t$ 121-$M_t$ each perform IFFT on the signals output from the beamformer #1 119-1 to the beamformer #N 119-N, and output the IFFT-processed signals to the transmitter #1 123-1 to the transmitter #$M_t$ 123-$M_t$ independently. The transmitter #1 123-1 to the transmitter #$M_t$ 123-$M_t$ each perform transmission signal processing on the signals output from the IFFT unit #1 121-1 to the IFFT unit #$M_t$ 121-$M_t$, and transmit the processed signals via the transmission antenna #1 125-1 to the transmission antenna #$M_t$ 125-$M_t$ independently.

A detailed description will now be made of an interleaving operation of the interleaver/per-mode power allocator 117.

The interleaver/per-mode power allocator 117 performs a 3-dimensional interleaving operation of antenna, time domain and frequency domain, in order to transmit the vector $\tilde{X}$ according to an equivalent channel $\tilde{h}[s, n, f]$ between deinterleavers. Herein, both the signal transmission apparatus and the signal reception apparatus should correctly know the equivalent channel $\tilde{h}[s, n, f]$.

The interleaver/per-mode power allocator 117 makes reference to $|\tilde{h}[s, n, f]|$ in order to determine an interleaved symbol input to a particular beamformer. A description will now be made of a process of determining an interleaved symbol input to the beamformer #1 119-1 by the interleaver/per-mode power allocator 117 by way of example.

The interleaver/per-mode power allocator 117 compares sizes of equivalent channels of the beamformer #1 119-1 in the frequency domain through $|\tilde{h}[s, n, f]|$ at a particular time n, and disperses, as components of the vector $\tilde{X}$, the information data symbols included in the modulation symbol output from the modulator #1 115-1 to which a mode 1 having the lowest full bit rate $R_t$ but having the highest recovery reliability among the modes is applied, over the $|\tilde{h}[s, n, f]|$ having the worst channel condition.

Thereafter, the interleaver/per-mode power allocator 117 disperses, as components of the vector $\tilde{X}$ having the next lower $|\tilde{h}[l, n, f]|$ the information data symbols included in the modulation symbol output from the modulator #2 115-2 to which a mode 2 is applied. In this manner, after the interleaver/per-mode power allocator 117 disperses, as components of the vector $\tilde{X}$ having the much lower $|\tilde{h}[l, n, f]|$, the information data symbols included in the modulation symbol output from the modulator #K 115-K to which a mode K is applied, the interleaving operation of the interleaver/per-mode power allocator 117 for the beamformer #1 119-1 is completed. After the interleaving operation is performed on the $M_t$ beamformers in this manner, the interleaving operation is finally completed. As a result, the interleaver/per-mode power allocator 117 performs an operation of mapping [k,i] to [s,n,f] according to 'h', and through the interleaving process, the channel is dispersed into K sub-channels having different channel qualities.

A further description of characteristics of the interleaver/per-mode power allocator 117 will be made hereinbelow.

(1) Sub-channels having a low Signal-to-Noise Ratio (SNR) use reliable modes, and sub-channels having a high SNR use modulation schemes which are more effective in terms of throughput. The SNR of each sub-channel is approximately mapped to the optimal power, coding rate, and reliability. This is the ultimate aim of the AMC scheme, and is applied to all channels.

(2) Coding is performed in different symbols of the same sub-channel. In each sub-channel, all symbols use the same power, constellation and coding rate, so there is rare adaptation gain between symbols in each sub-channel. Therefore, a diversity gain detected by codes is separable from the adaptation gain.

Next, a description will be made of a per-mode power allocation scheme.

(1) Equal Power Allocation (EPA) Scheme

Average power per symbol is equal for all symbols, and is $P_{k,i}$=P/MLN. The use of the EPA scheme can maintain an AMC gain obtained by applying modulation and coding rate. However, the use of the EPA scheme that sets the power equally without adjustment may cause a considerable throughput loss.

(2) Water-Filling (WF) Scheme

Energy of each symbol is calculated by the WF scheme as shown in Equation (11) to Equation (13).

$$P_{k,j} = \left(\frac{1}{\lambda} - \frac{N_0}{|\tilde{h}_k[i]|^2}\right)^+ \quad (11)$$

In Equation (11), + denotes an operation of $(x)^+=x$ (for x>0), or an operation of $(x)^+=0$ (for $x \leq 0$).

$$E\left\{P_{k,j} = \left(\frac{1}{\lambda} - \frac{N_0}{|\tilde{h}_k[i]|^2}\right)^+\right\} = P \quad (12)$$

The WF scheme, as shown in FIG. 2, adjusts an instantaneous reception SNR and a mode dispersion process in a receiver. Herein, the instantaneous reception SNR $SNR_r$ can be expressed as Equation (13).

$$SNR_r = \frac{P_{k,i}|\tilde{h}|^2}{N_0} \quad (13)$$

(3) WF Channel Inversion (WF/CI) Scheme

When the WF scheme is used, a reception $SNR_r$ in a particular mode is not constant for all symbols. Generally, in terms of decoding performance of a channel-coded codeword, an Additive White Gaussian Noise (AWGN) channel having the constant average reception $SNR_r$ is superior to a fading channel not having the constant reception $SNR_r$. When the WF scheme is used, there is a high possibility that the channel-coded codeword will suffer considerable performance degradation as it does not have the constant reception $SNR_r$. Therefore, the present invention newly proposes the WF/CI scheme, which is a combined scheme of the WF scheme and the CI scheme. When the WF/CI scheme is used, the power allocated for each individual mode is allocated in such a manner that the mode having the better channel status by the WF scheme uses higher power, and an SNR expected in the same mode remains constant by the CI scheme.

Basically, when the WF/CI scheme is used, an early WF scheme is used for power allocation of channels classified according to the interleaving scheme. That is, the WF scheme sequentially allocates power beginning at the channel having the best channel status until it arrives at the channel having the worst channel status. Herein, the channel having the best channel status is assumed to be $|h|_K^2$, and when the power allocation starts in the channel status of the channel $|h|_K^2$, a comparison will be made between the following two amounts of power.

(1) Power P[k] allocated when the WF scheme is used.

(2) Required Transmission Power $P_{req}$[k] necessary for a required $SNR_{req}$[k] necessary for error-less decoding of information blocks of a mode k, which were channel-coded and modulated, and also necessary for achieving the same.

$$P_{req}[k] = \max_k \frac{SNR_{req}[k]N_0}{|h(i)|^2}$$

A difference, P[k]–$P_{req}$[k], between the two powers indicates surplus power unnecessary for an operation in the mode k. The surplus power is allocated to the next channel, and the above operation is repeatedly performed in power allocation even for the next channel. The surplus power is allocated to the next channels until there is no surplus power.

Figures 4A, 4B:
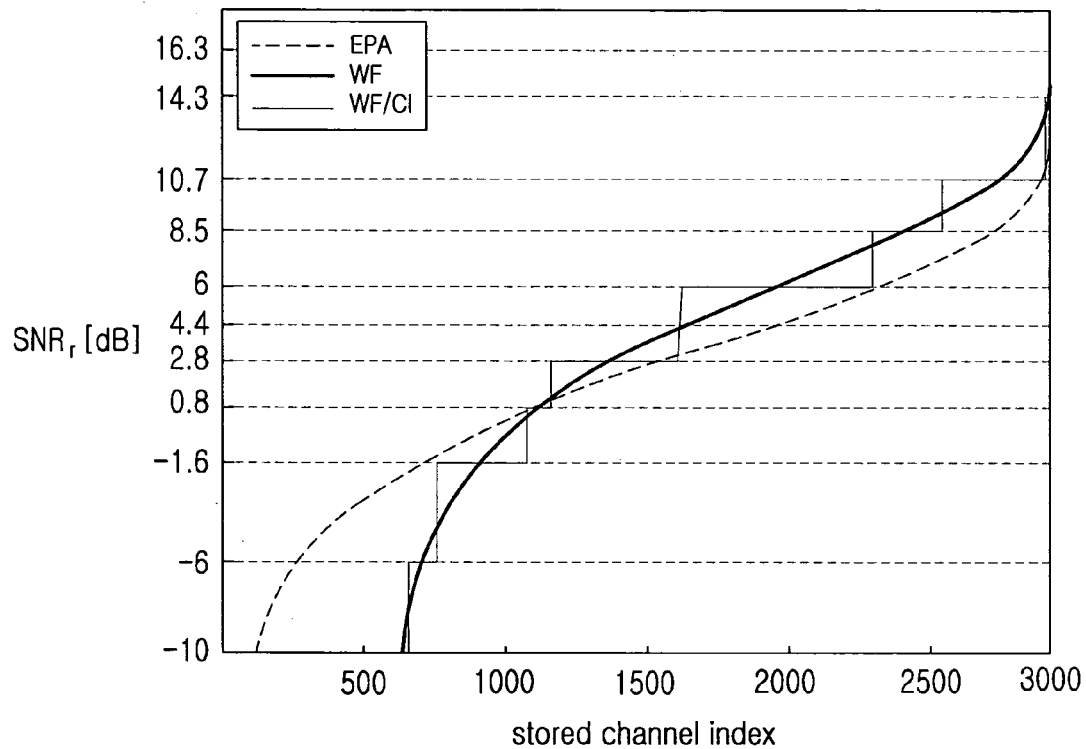
FIG. 4A is a graph illustrating a reception $SNR_r$ for each individual mode for one case where a WF/CI scheme according to an embodiment of the present invention is used, and another case where a EPA scheme and a WF scheme are used.
FIG. 4B is a graph illustrating a required reception $SNR_{req}$ [k] necessary for successful decoding by a mode k at a reception $SNR_r$ for each individual mode, for one case where a WF/CI scheme according to an embodiment of the present invention is used, and another case where an EPA scheme and a WF scheme are used.

With reference to FIGS. 4A and 4B, a description will now be made of a per-mode power allocation method in a MIMO-OFDM communication system according to an embodiment of the present invention. That is, with reference to FIGS. 4A and 4B, a description will be made of an operation of defining a reception $SNR_r$ for each individual mode according to a required reception $SNR_{req}$[k] necessary for successful decoding by the mode k, for the case where the WF/CI scheme according to an embodiment of the present invention is used, and the case where the EPA scheme and the WF scheme are used.

FIG. 4A is a graph illustrating a reception $SNR_r$ for each individual mode for the case where the WF/CI scheme according to an embodiment of the present invention is used, and the case where the EPA scheme and the WF scheme are used. FIG. 4B is a graph illustrating a required reception $SNR_{req}$[k] necessary for successful decoding by the mode k at a reception $SNR_r$ for each individual mode, for the case where the WF/CI scheme according to an embodiment of the present invention is used, and the case where the EPA scheme and the WF scheme are used.

Referring to FIGS. 4A and 4B, a required reception $SNR_{req}$[8] for, for example, a mode 8, is 10.7 [dB], and if power allocation is performed by the WF scheme as shown in FIG. 4A, a region of stored channel indexes 2600 to 2750 has a bad influence upon the decoding performance because the reception $SNR_r$[8] is lower than the required reception $SNR_{req}$[8], and in a region of stored channel indexes 2750 to 2950, the reception $SNR_r$ exceeds the required reception $SNR_{req}$[8]. On the contrary, the WF/CI scheme according to an embodiment of the present invention is characterized in that the reception $SNR_r$[8] remains constant in the mode 8. As described above, because the channel coding performance has a better characteristic at low change in the reception SNR like the AWGN channel, it can be understood that the WF/CI scheme according to an embodiment of the present invention is superior to the WF scheme in decoding performance.

As described in FIGS. 4A and 4B, the use of the WF/CI scheme sets the same reception $SNR_r$ for each individual mode, thereby preventing power waste due to the surplus power even in later application of the CI scheme.

Figure 5:
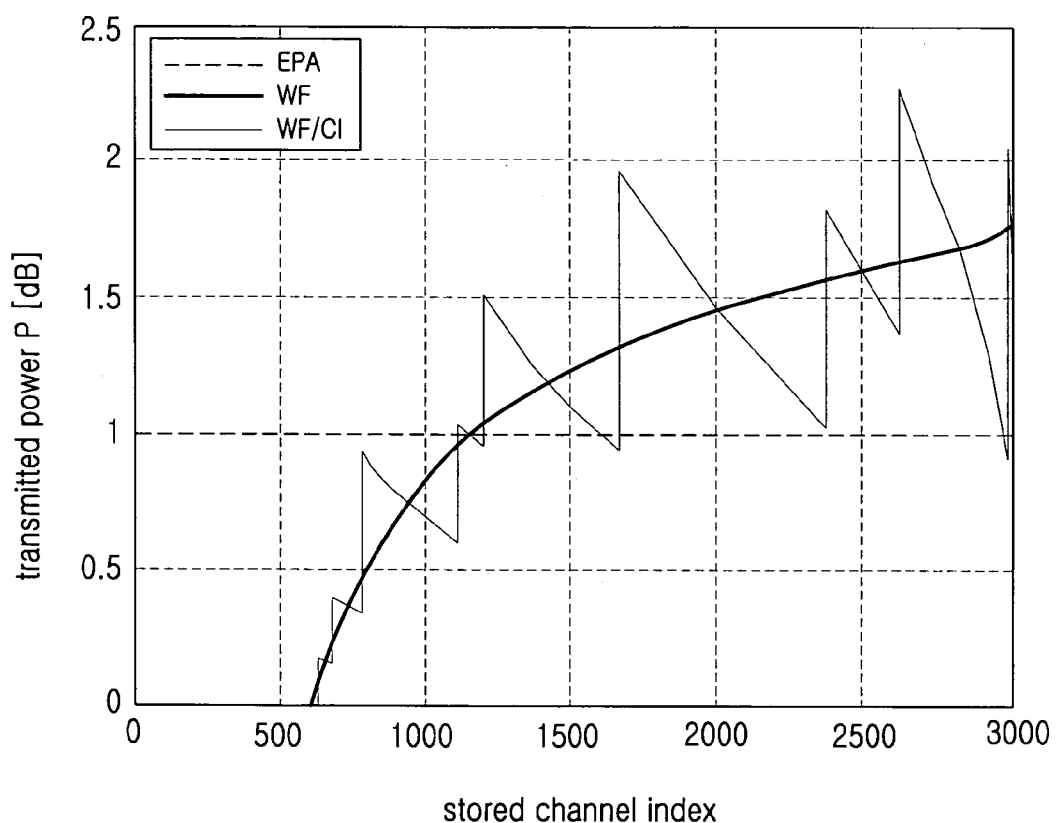
FIG. 5 is a graph illustrating a comparison between one case where a WF/CI scheme according to an embodiment of the present invention is used, and another case where an EPA scheme and a WF scheme are used.

FIG. 5 is a graph illustrating a comparison between one case where the WF/CI scheme according to an embodiment of the present invention is used, and another case where the EPA scheme and the WF scheme are used.

As shown in FIG. 5, when the WF/CI scheme proposed in the present invention is used, the CI scheme is applied only in the same mode, thereby preventing the unnecessary power allocation.

As described above, the present invention enables the MIMO-OFDM communication system to use the AMC scheme, thereby enabling high-speed, high-capacity signal transmission/reception and also enabling improvement of the total efficiency. Further, in the MIMO-OFDM communication system using the AMC scheme, the present invention uses the WF/CI scheme that applies the WF scheme and the CI scheme supported by the AMC scheme for each individual mode, thereby enabling efficient utilization of the power.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A method for transmitting a signal in a signal transmission apparatus of a communication system, comprising the steps of:
   upon receipt of an information vector, converting in parallel, by a serial-to-parallel converter, the information vector into a plurality of sub-information vectors;
   coding, by a plurality of encoders, each of the plurality of sub-information vectors according to a predetermined encoding scheme;
   modulating, by a plurality of modulators, each of the coded sub-information vectors according to a predetermined modulation scheme, thereby generating modulation symbols;
   interleaving, by an interleaver/per mode allocator, the generated modulation symbols;
   determining, by the interleaver/per mode allocator, a mode corresponding to a combination of the predetermined encoding scheme and the predetermined modulation scheme;
   allocating power, by the interleaver/per mode allocator, to the interleaved modulation symbols according to the determined mode; and
   beamforming, by a plurality of beamformers, the power-allocated modulation symbols, and transmitting the beamformed symbols by a transmitter,
   wherein the mode is determined based on a coding rate, a constellation size corresponding to the predetermined modulation scheme, and the allocated power,
   wherein each of the generated modulation symbols includes a mode index indicating the determined mode, and position information in the determined mode, and wherein the mode is one of a plurality of modes used in the signal transmission apparatus, and a reception Signal-to-Noise Ratio (SNR) targeted by each of the plurality of modes is determined by a required reception SNR set taking decoding reliability in a corresponding channel into account, and by a size of the corresponding channel.

2. The method of claim 1, wherein interleaving the modulation symbols comprises interleaving the modulation symbols to which a mode having a lowest full bit rate and a highest decoding reliability is applied.

3. The method of claim 1, wherein allocating power comprises allocating power to the interleaved modulation symbols according to the determined mode so as to provide a target SNR required in the determined mode.

4. The method of claim 1, wherein allocating power comprises allocating power to the interleaved modulation symbols according to the determined mode after applying channel inversion so as to provide a target SNR required in the determined mode.

5. The method of claim 1, wherein allocating power further comprises allocating power using a difference between power determined based on a channel status in the determined mode, and power required for a target SNR in the determined mode.

6. An apparatus for transmitting a signal in a communication system, comprising:
   a serial-to-parallel converter for, upon receipt of an information vector, converting in parallel the information vector into a plurality of sub-information vectors;
   a plurality of encoders for coding each of the plurality of sub-information vectors according to a-predetermined encoding scheme;
   a plurality of modulators for modulating each of the coded sub-information vectors output from the plurality of encoders according to a predetermined modulation scheme, thereby generating modulation symbols;
   an interleaver/per-mode power allocator for interleaving the generated modulation symbols output from the modulators, determining a mode corresponding to a combination of the predetermined encoding scheme and the predetermined modulation scheme, and allocating power for the interleaved modulation symbols according to the determined mode;
   a plurality of beamformers for beamforming the interleaved modulation symbols output from the interleaver/per-mode power allocator; and
   a transmitter for transmitting the beamformed signal,
   wherein the mode is determined based on a coding rate, a constellation size corresponding to the predetermined modulation scheme, and the allocated power,
   wherein each of the generated modulation symbols includes a mode index indicating the determined mode, and position information in the determined mode, and wherein the mode is one of a plurality of modes used in the signal transmission apparatus, and a reception Signal-to-Noise Ratio (SNR) targeted by each of the plurality of modes is determined by a required reception SNR set taking decoding reliability in a corresponding channel into account, and by a size of the corresponding channel.

7. The apparatus of claim 6, wherein the interleaver/per-mode power allocator interleaves the modulation symbols to which a mode having a lowest full bit rate and a highest decoding reliability is applied.

8. The apparatus of claim 6, wherein the interleaver/per-mode power allocator allocates power to the interleaved modulation symbols according to the determined mode so as to provide a target SNR required in the determined mode.

9. The apparatus of claim 6, wherein the interleaver/per-mode power allocator allocates power to the interleaved modulation symbol according to the determined mode after applying channel inversion so as to provide the target SNR in the determined mode.

10. The apparatus of claim 6, wherein each of the plurality of modulators allocates power using a difference between power determined based on a channel status in the determined mode, and power required for a target SNR in the determined mode.

* * * * *